(No Model.)

W. KEGLER.
PUMP.

No. 399,199. Patented Mar. 5, 1889.

Witnesses:
A. M. Rosenfield
J. A. Johnson

Inventor:
William Kegler
per N. B. Fassett
Atty

UNITED STATES PATENT OFFICE.

WILLIAM KEGLER, OF BELLEVUE, IOWA.

PUMP.

SPECIFICATION forming part of Letters Patent No. 399,199, dated March 5, 1889.

Application filed April 7, 1888. Serial No. 270,004. (No model.)

*To all whom it may concern:*

Be it known that I, WILLIAM KEGLER, a citizen of the United States, residing at Bellevue, in the county of Jackson and State of Iowa, have invented certain new and useful Improvements in Pumps; and I do hereby declare the following to be a full, clear, and exact description of the same, reference being had to the annexed drawings, making part of this specification.

This invention relates to improvements in chain-pumps, and has for its object the construction of metallic tubes coupled together to form a pump-stock for chain-pumps, said tubes to have abutting flanges held firmly against an intervening leather or rubber gasket by means of thimble-couplings bearing against the back sides of said flanges; also, said pipes are so constructed as to form in the seam an interior groove or backwater-passage running the whole length of each pipe, the object of said groove being to let the water settle back into the well or cistern when the operation of pumping has ceased. Furthermore, the seam thus made in the pipes affords an external rib or flange, which enters into a corresponding seat or recess in the interior of the thimble-couplings to prevent them turning on their respective pipes; also, an inverted-funnel-shaped ring is soldered or otherwise secured to the lower end of the pipe, to prevent the buckets from catching upon the end of the tube.

Figure 1:
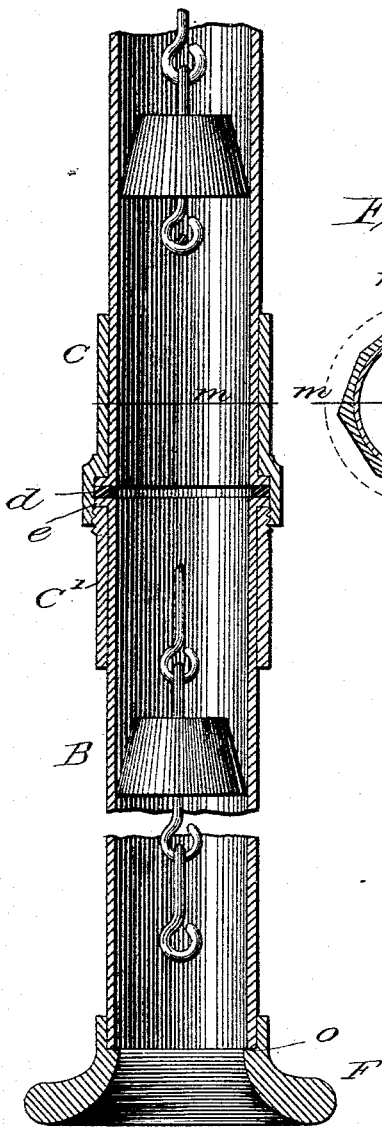
Figure 2:
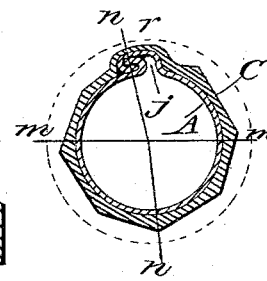
Figure 3:
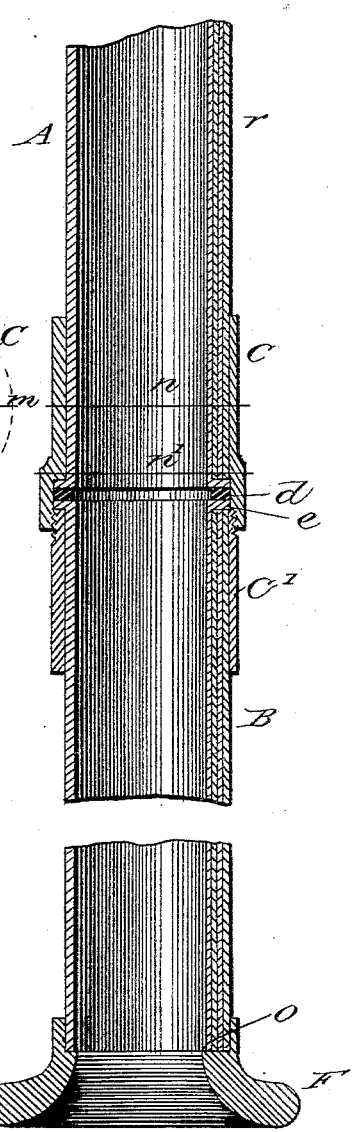

In the drawings, Figure 1 is a vertical section of my improved pump-tubes, with their flanges, the coupling-thimbles, leather gasket, and funnel-ring at the bottom. Fig. 2 (exclusive of the dotted circle) is a transverse section on the line $m$ in Fig. 1, which also coincides with line $m$ in this figure. Fig. 3 is a vertical section cutting the broken line $n\ n$ in Fig. 2. Fig. 2 (excluding the dotted circle) is also built on the line $n$ in Fig. 3, but including the dotted circle it is built on the line $n'$ in Fig. 3.

A and B represent two lengths of metallic tubing; C, the upper coupling-thimble, and C' the lower; $d$, the gasket; $e$, the abutting flange on the pipe ends; F, the funnel-ring; $j$, the groove or backwater-passage; $r$, the rib on the outside of the pipe, working through a recess in the coupling-thimbles. These coupling-thimbles are slipped upon their respective pipes, and the ends of the latter are then swaged down to form the flange $e$. The two coupling-thimbles are then brought against their respective flanges and the leather gasket placed in the coupling C against the flange, when the two parts C and C' may be screwed together either by turning the tube or the coupling-thimble.

In Fig. 2 the form of the seam is represented, showing the groove or backwater-passage $j$ and the mode of interlocking the two edges of the pipe so as to form the groove in the seam. By the use of this groove I am enabled to use close-fitting buckets having no water passage-ways, as heretofore used, through which to let the water settle back into the well after the pumping has ceased. The seam is then soldered either inside or outside, or both, as may be desired.

For a little distance upward from the lower end of the tube I expand it so as to admit of a slight projection inwardly of the face of the funnel-ring F beyond the inside surface of the tube, as shown at $o$, where the ring and pipe are soldered together, the projection being made in order to protect the solder, and the expansion in order to secure uniformity of size between the ring and the pipe a little distance from the ring. The groove in the pipe is continued straight down through the inner face of the ring.

By the use of my grooved pipe a far cheaper bucket may be used—one that will not require frequent expansion or attention of any kind—and as the pipe is made very smooth inside a solid bucket will wear a long time without renewal, fitting the pipe close enough for all practical purposes, and yet permitting the water to settle back through the groove $j$ quick enough to prevent freezing in winter or becoming warm in summer.

The main object of the backwater-groove $j$ is to do away with the hitherto practice of opening a channel through the buckets to let the water settle through and to avoid the expense of expansion-buckets now in common use.

I claim—

In a chain-pump, the combination of the metallic flanged tubes A and B, having the backwater-groove $j$, seam-rib $r$, entering recesses in the coupling-thimbles C and C', and the inverted-funnel ring F, all constructed substantially as and for the purposes set forth.

WILLIAM KEGLER.

Attest:
JOSEPH SCHWIRTZ,
JOHN HANAPEL.